United States Patent

[11] 3,590,356

[72] Inventor Laurence C. Hofmeister
 Fort Lauderdale, Fla.
[21] Appl. No. 799,775
[22] Filed Feb. 17, 1969
[45] Patented June 29, 1971
[73] Assignee The Bendix Corporation

[54] LIGHT SENSITIVE SERVOMOTOR CONTROL CIRCUIT
 1 Claim, 2 Drawing Figs.
[52] U.S. Cl. .................................................. 318/640,
 318/678, 318/681
[51] Int. Cl. .............................................. G05b 1/06
[50] Field of Search ........................................ 318/20.605,
 20.821, 20.835

[56] References Cited
UNITED STATES PATENTS

| | | | |
|---|---|---|---|
| 3,092,764 | 6/1963 | Cooper ........................ | 318/6 |
| 3,340,785 | 9/1967 | Adler et al. .................. | 318/20.605 X |
| 3,426,662 | 2/1969 | Sevin .......................... | 318/20.821 X |

Primary Examiner—T. E. Lynch
Attorneys—Plante, Arens, Hartz, Hix & Smith, Bruce L. Lamb, William G. Christoro and Lester L. Hallacher ABSTRACT: A light sensitive control circuit for a voltage sensitive motor is described. The circuit includes two light sensitive elements which receive equal amounts of light when an element which is controlled by the circuit is positioned properly. Undesired movement of the element results in changes in the light received by the light sensitive elements thereby resulting in a loss of their equality. The diodes form a part of a balanced circuit, across which the motor is connected. In the balanced position, both sides of the motor are at the same potential and it remains stationary. When the control circuit becomes unbalanced in response to changes in the light sensitive elements, the motor is connected across a potential difference and rotates in a direction dictated by the direction of the potential difference. Rotation of the motor corrects the position of the element under control and simultaneously equalizes the light impinging upon the light sensitive elements and thereby rebalances the control circuit.

PATENTED JUN 29 1971

3,590,356

INVENTOR
LAURENCE C. HOFMEISTER

BY Lester L Hallacher

ATTORNEY

LIGHT SENSITIVE SERVOMOTOR CONTROL CIRCUIT

Various types of equipment include systems which automatically maintain a mechanical member in a desired orientation. Such systems necessarily include a means for determining the deviation from the desired orientation and also a means for returning the member to the desired orientation. Ordinarily such systems include a circuit for generating a signal in response to deviations in the orientations in the member. The circuits include a system of switches which are divided into two groups. One group of switches is actuated for orientation changes in one direction and the other group for changes in the opposite direction. Orientation changes which are not sufficient to actuate a set of switches have no effect on the system and are thus not subject to connection. As used herein, actuation of a switch can mean either opening or closing, depending upon the exact nature of the system in which it is used.

An example of such a system is an automatic trim actuator for an aircraft. The automatic trim system is used to maintain the control surfaces of the aircraft in a desired orientation without manual adjustment by the pilot. Changes in the control surface orientation are occasioned by changes in ambient pressure, aircraft weight changes due to fuel consumption, actuation of flaps, etc. These changes will adversely affect the trim of the aircraft and result in unwanted and unexpected attitude changes unless they are offset either manually or automatically.

The switching or on-off type of system mentioned above has sometimes been used in an attempt to automatically correct changes occasioned by the aforementioned causes. However, such systems are not always satisfactory, because their actuation requires a change which equals or exceeds a minimum magnitude. This is so because the change of orientation must be sufficient to cause the actuation of a switch. Small changes in orientation therefore do not actuate the on-off type of automatic trim system.

Another deficiency stems from the absence of a relationship between the magnitude of the control signal and the magnitude of the deviation. When the deviation is sufficient to actuate a switch, a control signal of a particular level is generated. A level of the control signal is the same for any magnitude of deviation and orientation irrespective of the deviation. Consequently, a control signal which may be above or below the optimum level is usually applied to the control system. A signal which is below an optimum level results in an increased time requirement for the full correction to take place. Furthermore, when sufficient correction to deactuate the switch occurs, the correction signal ceases, and the optimum orientation may never be obtained. A signal which is above an optimum level results in an abrupt and sometimes excessive correction resulting in overshoot of the desired orientation and hunting about this orientation.

These disadvantages can be overcome by a proportional trim system. In such a system, the magnitude of the correction signal is related to the magnitude of the deviation from the optimum orientation. Accordingly, the correction signal increases or decreases as the deviation decreases or increases. Also, by eliminating the switches and replacing them with proportional sensors, correction signals are generated for small deviations which are less than those required to actuate the switches of the on-off system. Such a system therefore eliminates the abrupt changes, hunting and insufficient correction deficiencies which are common to the on-off type of system.

A sensor and control system which is proportionally responsive to orientation deviations is fully described in application Ser. No. 799,774; entitled "Proportional Trim Sensor" by L. C. Hofmeister, filed of even date herewith and assigned to the same assignee as the instant invention. The proportional trim sensor described therein is capable of producing a correction signal which is related in magnitude and sense to the deviation of the control surface of the aircraft. The invention described herein is directed to a circuit for receiving a correction signal from the proportional sensor and processing it to effect a return of the control surface to the desired orientation.

The description is directed to utilization of the inventive circuit in an automatic trim system for aircraft, this is done in order to more clearly illustrate the operational characteristics and advantages of the device in an environment. Other elements can be automatically positioned by the inventive circuit.

It is therefore an object of this invention to describe a control circuit which is responsive to an input signal having any level and sense and generating an output which is related in both magnitude and sense thereto.

It is another object of this invention to provide such a circuit, the output of which is used to control a mechanical element to thereby maintain said element in a desired orientation.

Further objects, features and advantages of the invention will become apparent from the following description and claims when read in view of the accompanying drawings, wherein like numbers indicate like parts and in which:

Figure 1:
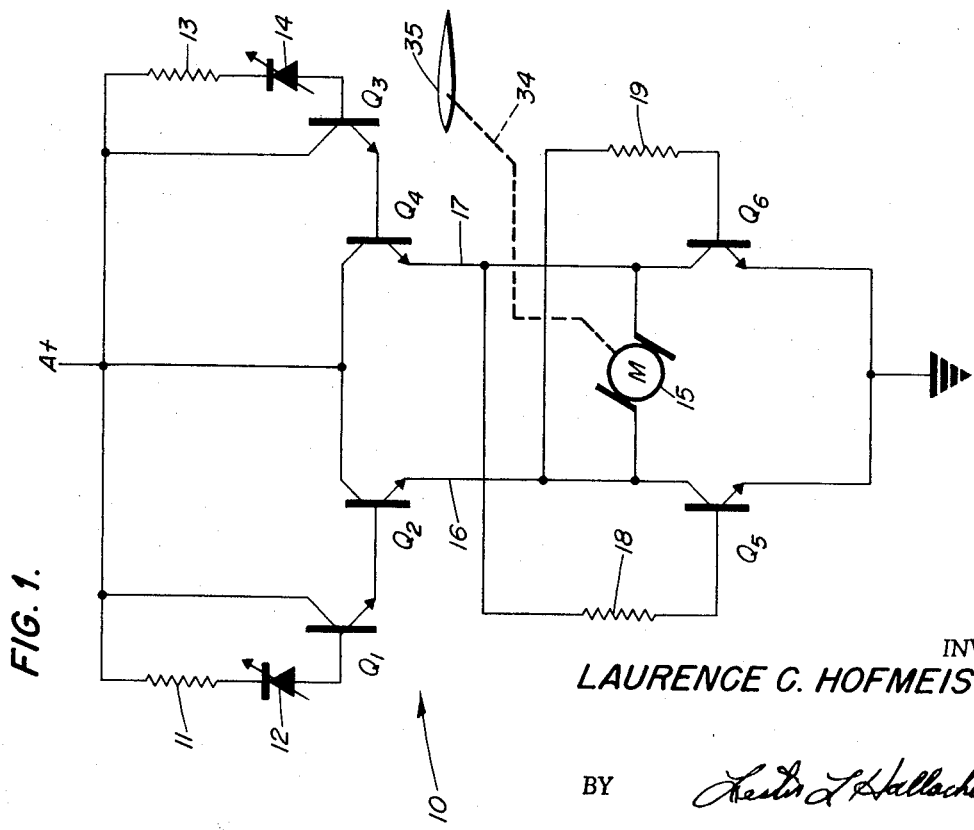
FIG. 1 shows a preferred embodiment of the instant invention.

In FIG. 1 the inventive circuit is designated generally by reference numeral 10. The circuit is composed of two parallel current paths running between the A+ biasing source and a ground connection. The first current path includes Transistors $Q_1$, $Q_2$ and $Q_5$ and the second current path includes Transistors $Q_3$, $Q_4$ and $Q_6$. The biasing potential is applied to the base of Transistor $Q_1$ through a biasing Resistor 11 and a Photosensitive Element 12. The biasing source is applied to the base of Transistor $Q_3$ through a biasing Resistor 13 and a second Photosensitive Resistor 14. It should be noted that photosensitive Diodes 12 and 14 are substantially identical and in the embodiment shown are sensitive to the impingement of light. However, other radiation sensitive elements could be used in lieu of photosensitive elements and remain within the spirit and scope of the invention. The emitter of Transistor $Q_1$ is connected to the base of Transistor $Q_2$ such that Transistor $Q_2$ is sensitive to the voltage changes which occur at the base of Transistor $Q_1$. The output of Transistor $Q_2$ is connected to ground through the collector emitter junction of Transistor $Q_5$. In a similar manner the emitter of Transistor $Q_3$ is connected to the base of Transistor $Q_4$, the output of which is connected to ground through the collector emitter junction of Transistor $Q_6$. It should be noted that by using identical transistors for the pairs of Transistors $Q_1$ and $Q_3$, pair $Q_2$ and $Q_4$ and pair $Q_5$ and $Q_6$, the overall circuit is composed of two parallel identical current paths. A DC Motor 15 is connected to Lines 16 and 17 and therefore is connected across the two parallel current paths. Consequently, when the two paths are of equal impedances, the potential difference across Motor 15 is zero the motor remains stationary. However, an inequality of current flow through the two current paths result in a potential difference across Motor 15 resulting in a rotation of Motor 15. The magnitude and sense of the potential difference across Motor 15 will dictate the direction and speed of rotation of the motor.

The base of Transistor $Q_5$ is connected to Line 1 by a Resistor 18. In similar fashion, the base of Transistor $Q_6$ is connected to Line 16 by a Resistor 19. The two current paths are therefore mutually dependent and current changes in each path affects that of the other path.

Figure 2:
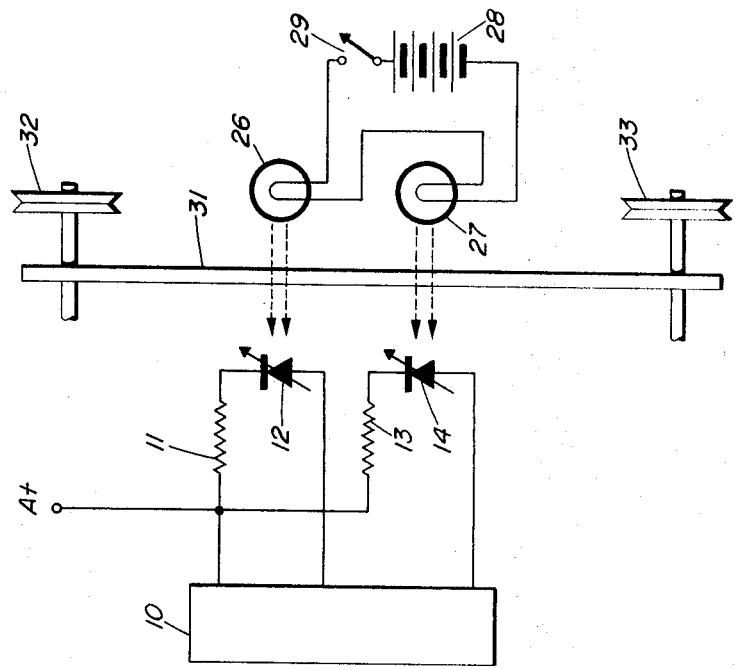
FIG. 2 shows a portion of the sensor system which actuates the control circuit shown in FIG. 1.

The imbalance of the circuit is effected by causing an unequal amount of light to impinge upon Photosensitive Elements 12 and 14. It should be noted that Filter 31 of FIG. 2 is preferably constructed such that neither Transistor $Q_1$ or $Q_3$ is conductive in the balanced position. The impedance of Photosensitive Elements 12 and 14 change with changes in light impinging thereon. Accordingly, unequal impingement of light ultimately results in the inequality of current flow through the two current paths. When such an inequality exists, the voltages applied to the bases of Transistors $Q_1$ and $Q_3$, and consequently, also to Transistors $Q_2$ and $Q_4$ bases, are different and a difference of potential exists across the terminals of Motor 15, thereby causing Motor 15 to rotate in a direction dictated by the direction of the potential difference. The connection of the bases of Transistors $Q_5$ and $Q_6$ to the opposite current path causes a substantial difference in the voltages applied to the bases of these transistors, and therefore, accentuates the difference in potential existing across Motor 15. This increases the sensitivity of the circuit to small changes in the impedances of Photosensitive Elements 12 and 14 due to changes of light impinging thereon.

FIG. 2 is a partial showing of the mechanical mechanism which is used to cause a varying amount of light to impinge upon Photosensitive Diodes 12 and 14. The full details of the sensor mechanism are shown in the application to L. C. Hofmeister referred to hereinabove. Photosensitive Elements 12 and 14 are located in the physical proximity of two long life Lamps 26 and 27. Lamps 26 and 27 are arranged such that each provides light to only one of the two Photosensitive Elements 12 and 14. Physically located between Photosensitive Elements 12 and 14 and Lamps 26 and 27 is a variable density Filter 31. The density of Filter 31 varies such that its light transmission capabilities also varies. The variation is such that when in the neutral or balanced position, Photosensitive Elements 12 and 14 receive equal amounts of light from Lamps 26 and 27. However, when Filter 31 moves upwardly or downwardly in response to a deviation of the mechanical member, the light to one Photosensitive Element will increase while that to the other Photosensitive Element will decrease. This causes a loss of the balanced condition of the two current paths of the control circuit resulting in a potential difference across the Motor 15. As Motor 15 rotates in response to the potential difference, Filter 31 is caused to move toward its neutral position until Photosensitive Elements 12 and 14 again receive equal amounts of light. At this point, the photosensitive elements again have equal impedances and the control circuit is again balanced, resulting in the cessation of rotation of Motor 15. The system remains in the balanced condition until it is again caused to become unbalanced by some outside force working upon the controlled element.

Referring again to FIG. 2 it is noted that the Lamps 26 and 27 are connected in series to a Battery 28 through a Switch 29. Switch 29 can be used to actuate the Lamps 26 and 27 and also to control the bias applied to the control circuit. Lamps 26 and 27 are preferably connected in series so that the outage of one will result in the outage of the other and thereby prevent a substantial undesirable imbalance of the control circuit. Such an undesirable imbalance could cause Motor 15 to attempt a correction which would not actually be needed in the absence of a malfunctioning Lamp 26 or 27.

It should also be noted that Filter 31 is connected to Pulleys 32 and 33 which move together and in the same direction in response to motion of the element under control. This action is more fully described in the copending application fully identified hereinabove. Motor 15 is shown connected to the Control Surface 35 through a mechanical connection represented generally by broken lines 34. The exact mechanical connection of Motor 15 to Control Surface 35 forms no part of the invention as any of several existing systems could be used. For example, a gear mechanism, a hydraulic system, or an electrical clutch could be used to effect the connection. In the event that an electrical clutch is used, the field coil of the clutch could be connected across the control circuit such that the current through the coil is also controlled by the control circuit.

Although this invention has been described with respect to a particular embodiment thereof, it is not to be so limited, as changes and modifications may be made therein within the spirit and scope of the invention as defined by the appended claims.

The invention I claim is:

1. An electrical circuit for receiving an input signal indicative of the spatial orientation of a mechanical member and yielding an output signal for causing said mechanical member to maintain a desired spatial orientation, said circuit being connected between a source of operating voltage and ground, said circuit comprising:

two current paths connected in parallel between said source of operating voltage and ground, each said current path including a photosensitive element and first and second transistor amplifiers, each said transistor amplifier having a control input terminal;

an electric motor connected mechanically to said mechanical member and connected electrically between the junctions of said first and second amplifiers in each of said two current paths, whereby said motor will move in direction and amount according to the unbalance in current flowing in said current paths, positive feedback means for increasing the sensitivity of said circuit to unbalance of current in said current paths whereby an increase in current in one of said paths causes reduction of current in the order of said paths and vice versa; and means for varying an electrical parameter of said photosensitive elements to cause unbalance of current in said paths, including:

a plurality of light sources, each said light source illuminating one said photosensitive element, a light filter, said light filter being interposed between said light sources and said photosensitive elements, the opacity of said light filter varying along a linear dimension of said filter, said filter being mechanically connected to said mechanical member, said filter being moved along said linear dimension by movement of said mechanical member, whereby movement of said mechanical member from said desired orientation causes said filter to so move that said light sources illuminate said photosensitive elements unequally thereby unbalancing the currents in said two current paths and causing said motor to move in direction and amount to restore said member to said desired orientation.